United States Patent
Xu et al.

(10) Patent No.: US 10,393,852 B2
(45) Date of Patent: Aug. 27, 2019

(54) METHOD AND SYSTEM OF LOCATION ESTIMATION AND NAVIGATION OF AUTONOMOUS VEHICLES

(71) Applicant: HERE Global B.V., Eindhoven (NL)

(72) Inventors: Jingwei Xu, Buffalo Grove, IL (US); Bruce Bernhardt, Wauconda, IL (US); Arnold Sheynman, Northbrook, IL (US)

(73) Assignee: HERE Global B.V., Eindhoven (NL)

( * ) Notice: Subject to any disclaimer, the term of this patent is extended or adjusted under 35 U.S.C. 154(b) by 410 days.

(21) Appl. No.: 14/856,068

(22) Filed: Sep. 16, 2015

(65) Prior Publication Data
US 2017/0074964 A1    Mar. 16, 2017

(51) Int. Cl.
*G01S 5/02* (2010.01)
*G08G 1/00* (2006.01)
*G01S 19/24* (2010.01)
*G01S 19/48* (2010.01)

(52) U.S. Cl.
CPC ............... *G01S 5/02* (2013.01); *G01S 19/24* (2013.01); *G01S 19/48* (2013.01); *G08G 1/20* (2013.01)

(58) Field of Classification Search
CPC . G01S 5/02; G01S 19/48; G01S 19/24; G01S 5/0263; G01S 19/13; G08G 1/20; H04B 10/114
USPC .......................................................... 342/457
See application file for complete search history.

(56) References Cited

U.S. PATENT DOCUMENTS

| | | | |
|---|---|---|---|
| 6,061,021 A * | 5/2000 | Zibell | G01S 5/0027 342/357.64 |
| 8,417,444 B2 | 4/2013 | Smid et al. | |
| 8,502,670 B2 * | 8/2013 | Cha | G01S 13/82 340/572.1 |
| 8,659,429 B1 * | 2/2014 | Wagner | G01S 5/0263 340/539.13 |
| 9,816,827 B1 * | 11/2017 | Slusar | G01S 19/13 |
| 2006/0071790 A1 * | 4/2006 | Duron | G01S 13/75 340/572.1 |
| 2006/0290499 A1 * | 12/2006 | Chang | G01S 5/0263 340/572.1 |

(Continued)

FOREIGN PATENT DOCUMENTS

WO    WO 2009/097617 A2    8/2009
WO    WO 2009097617 A2 *   8/2009   ............... G01S 5/14

OTHER PUBLICATIONS

K. Gade, Introduction to Inertial Navigation and Kalman Filtering. Tutorial for IAIN World Congress, Stockholm, Sweden, https://www.navlab.net/Publications/Introduction_to_Inertial_Navigation_and_Kalman_Filtering.pdf, Oct. 2009 (Year: 2009).*

(Continued)

*Primary Examiner* — Bernarr E Gregory
*Assistant Examiner* — Fred H Mull
(74) *Attorney, Agent, or Firm* — Alston & Bird LLP

(57) ABSTRACT

A method is provided, which includes scanning at least one radio frequency identification (RFID) tag to obtain an identifier of the RFID tag; querying a database using the identifier of the at least one RFID tag to collect information about a location of the at least one RFID tag; determining a bias of a vehicle relative to the location of the scanned at least one RFID tag; and calculating a location of the vehicle based on the bias and the location of the at least one RFID tag.

20 Claims, 6 Drawing Sheets

Initial bias² = (RFID reader detection range)² − (Height)²

(56) References Cited

U.S. PATENT DOCUMENTS

| | | | |
|---|---|---|---|
| 2007/0008129 A1* | 1/2007 | Soliman | G01S 1/68 340/572.1 |
| 2012/0280836 A1 | 11/2012 | Roesner | |
| 2014/0243013 A1* | 8/2014 | Liu | H04W 64/003 455/456.1 |
| 2014/0379255 A1* | 12/2014 | Johnson | G01C 21/206 701/470 |
| 2017/0078852 A1* | 3/2017 | Tan | H04B 10/114 |

OTHER PUBLICATIONS

Dictionary definition for road. (2015). The Chambers Dictionary (13th ed.). London, UK: Chambers Harrap. Retrieved from https://search.credoreference.com/content/entry/chambdict/road/0 (Year: 2015).*

International Searching Authority, International Search Report and Written Opinion for International Application No. PCT/US2016/049459, dated Nov. 17, 2016, 17 pages, European Patent Office, Netherlands.

Peng, J., et al., "A New GPS/RFID Integration Algorithm Based on Iterated Reduced Sigma Point Kalman Filter for Vehicle Navigation", Proceedings of $22^{nd}$ International Meeting of the Satellite Division of the Institute of Navigation, Sep. 22-25, 2009, pp. 803-810, Savannah, Georgia.

* cited by examiner

Initial bias² = (RFID reader detection range)² − (Height)²

METHOD AND SYSTEM OF LOCATION ESTIMATION AND NAVIGATION OF AUTONOMOUS VEHICLES

TECHNICAL FIELD

A method, apparatus, and system are disclosed for location estimation and navigation of autonomous vehicles.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

Technology related to autonomous cars, also known as self-driving cars, is becoming popular topic in recent years. Major technology companies and car manufactures have invested large amounts of resources in this area.

One aspect of autonomous cars that has garnered a deal of attention is accurately estimating a location of an autonomous vehicle. Satellite based navigational aids can help an autonomous vehicle identify its location in line of sight situations which allows its position to be updated on a map using map matching techniques. Additionally, autonomous vehicle control centers can keep track of each autonomous vehicle's position and potentially maintain the remote navigation control of each autonomous vehicle based on their respective current driving position on a road segment and the given traffic information of each road segments delivered by traffic service providers.

SUMMARY

Embodiments of the present invention are directed to an apparatus, method and computer readable memory that satisfy the need for obtaining the location of an autonomous vehicle more accurately.

A method having features of the present invention comprises: scanning at least one radio frequency identification (RFID) tag to obtain an identifier of the RFID tag; querying a database using the identifier of the at least one RFID tag to collect information about a location of the at least one RFID tag; determining a bias of a vehicle relative to the location of the scanned at least one RFID tag; and calculating a location of the vehicle based on the bias and the location of the at least one RFID tag.

In another exemplary embodiment, an apparatus comprises at least one processor; and at least one memory including computer program code; the at least one memory and the computer program code configured to, with the at least one processor, cause the apparatus at least to perform: scan at least one radio frequency identification (RFID) tag to obtain an identifier of the RFID tag; query a database using the identifier of the at least one RFID tag to collect information about a location of the at least one RFID tag; determine a bias of a vehicle relative to the location of the scanned at least one RFID tag; and calculate a location of the vehicle based on the bias and the location of the at least one RFID tag.

In another exemplary embodiment, an apparatus comprises means for scanning at least one radio frequency identification (RFID) tag to obtain an identifier of the RFID tag; means for querying a database using the identifier of the at least one RFID tag to collect information about a location of the at least one RFID tag; means for determining a bias of a vehicle relative to the location of the scanned at least one RFID tag; and means for calculating a location of the vehicle based on the bias and the location of the at least one RFID tag.

Another exemplary embodiment comprises a computer program comprising code for scanning at least one radio frequency identification (RFID) tag to obtain an identifier of the RFID tag; code for querying a database using the identifier of the at least one RFID tag to collect information about a location of the at least one RFID tag; code for determining a bias of a vehicle relative to the location of the scanned at least one RFID tag; and code for calculating a location of the vehicle based on the bias and the location of the at least one RFID tag The computer program of this paragraph, wherein the computer program is a computer program product comprising a computer-readable medium bearing computer program code embodied therein for use with a computer.

BRIEF DESCRIPTION OF THE DRAWINGS

These and other features, aspects, and advantages of the present invention will become better understood with regard to the following description, appended claims, and accompanying drawings, where:

DETAILED DESCRIPTION

Figure 1:
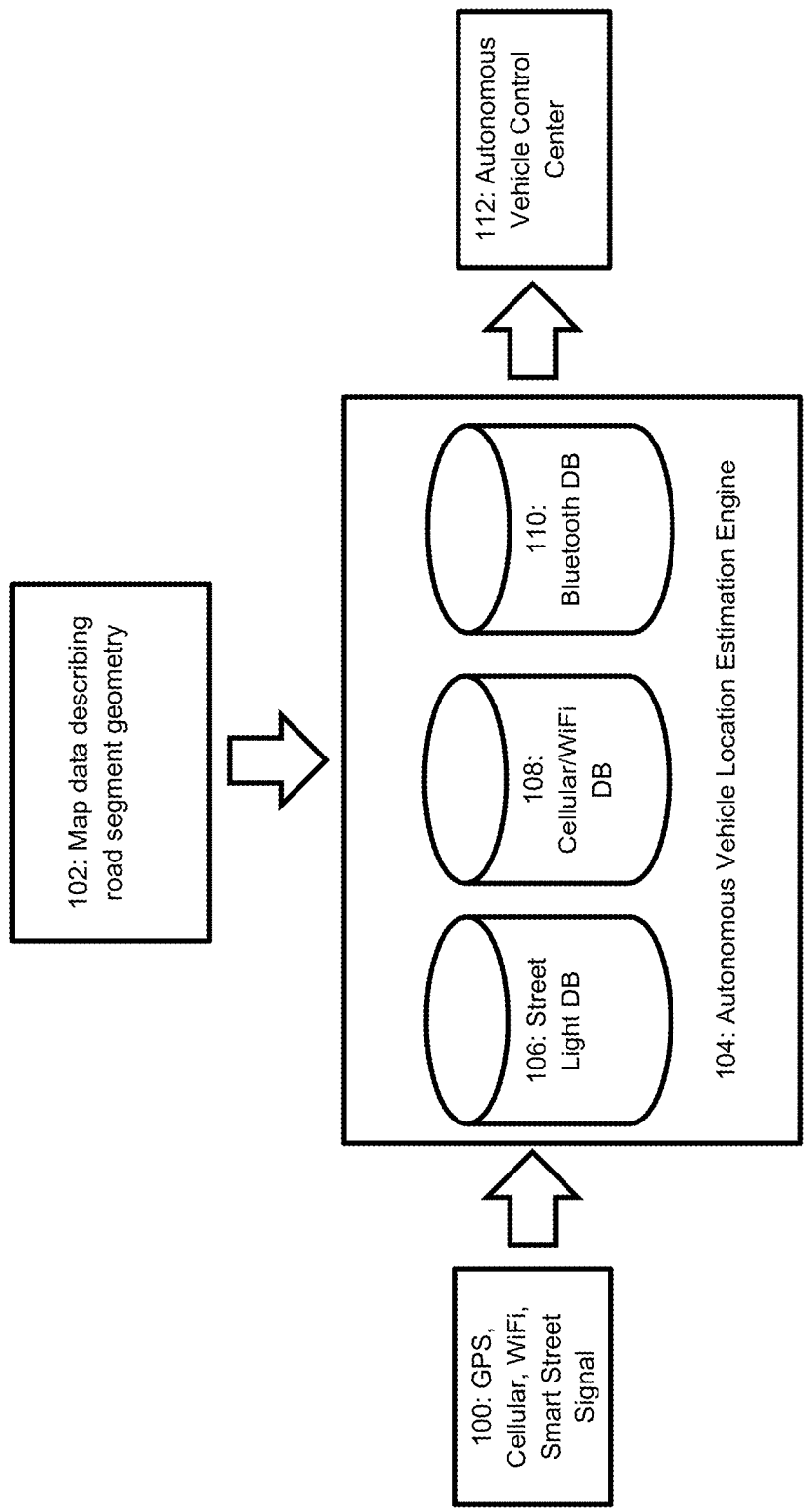
FIG. 1 shows an overview of an autonomous vehicle location estimation system according to aspects of the invention.

In the Summary above and in the Detailed Description and the claims below, and in the accompanying drawings, reference is made to particular features (including method steps) of the invention. It is to be understood that these various features may be combined despite that the description herein does not explore explicitly every single such possible combination. The specific embodiments that are detailed with particularity herein are not a limit to the general teachings herein, and such exemplary embodiment by themselves are not a limit to the scope of the ensuing claims but rather teach the principles of the invention and illuminate the meaning of such ensuing claims.

An autonomous vehicle can be equipped with a GNSS (Global Navigation Satellite System) receiver which can be either Global Positioning System (GPS) technology, GLONASS technology, Galileo technology or Beidou technology to locate the vehicle using signals received from multiple satellites through triangulation methods.

In line of sight situations, GNSS technology, such as GPS, is relatively mature and can provide moderate accuracy to meet customer needs. Other GNSS technologies, such as Beidou, Galileo, GLONASS, Compass, are planned to be put into commercial service worldwide in the near future. It is expected that, in most cases, the combination of these GNSS technologies will provide accurate location estimation for an autonomous vehicle location estimation in line of sight situations. However, for non-line of sight situations, it is hard to use GNSS signals to provide a stable autonomous vehicle location estimation solution. For example, 'urban canyons' are downtown city areas where signals from GNSS satellites can be completely blocked or highly impaired while driving on streets surrounded by tall buildings. Another example is when a car is driving through a heavily wooded area where trees may be obstructing the signals.

Alternative methods to using GNSS signals utilize different kinds of radio frequency (RF) signals to estimate a device's location. These RF signals can include cellular (GSM, WCDMA, LTE, small cell), wireless local area network (WLAN), and/or Bluetooth technologies. However, currently such technologies do not provide suitable accuracy. Generally, these technologies may provide accuracy of approximately 50 meters, but when using only cellular technology the accuracy degrades to hundreds meters of range or worse. Therefore, it is unlikely that a complete solution to provide autonomous vehicle location estimation can be accomplished by using only RF and GPS signals even with the aid of in vehicle sensor technology (such as compasses, gyroscopes, and accelerometers). Vehicle location estimation is one of the core components in autonomous vehicle navigation technology both from a traffic perspective and from a Point of Interest (POI) perspective.

Embodiments herein address these limitations by providing a hybrid autonomous vehicle location estimation process engine system capable of estimating the location of an autonomous vehicle and road segments of where the autonomous vehicle is driving. The location information is delivered with road segments to an autonomous vehicle control center. The autonomous vehicle control center can provide better vehicle monitoring, management, and control services to customers. On a digital map, each road segment is assigned an ID to represent this road segment and make sure the ID is globally unique. Additionally, driving costs are minimized and road accident risks are mitigated by assisting the autonomous vehicle control center to plan optimal route based on road traffic conditions, especially for areas where GNSS technologies are inaccurate.

Embodiments of the invention are related to autonomous vehicular location estimation and navigation systems while driving in GPS challenging environments, for example, urban canyons or forest areas. In these situation, GPS signals are too weak or not available for calculating the exact location the autonomous vehicles through a typical triangulation method which requires at least four satellites signals available.

FIG. 1 shows an overview for an autonomous vehicle location estimation system according to an aspect of the invention. Multiple sources of inputs 100 are provided to the autonomous vehicle location estimation engine 104. The sources of inputs, for example, may include GPS data, WiFi data, and Cellular data. Another source of input, for example, is smart street lights having integrated RFID technology. The smart street lights may assist in estimating a vehicle location, particularly in environments where GPS signals may be obstructed or blocked. The inputs are real-time radio signal data received by the autonomous vehicle location estimation engine 104 from these multiple sources. The autonomous vehicle location estimation engine 104 also receives map data 102, which includes map artifact data describing the road segment topology and geometry. Upon receiving the radio signal data, the autonomous vehicle location estimation engine 104 uses a hybrid location estimation algorithm to combine these inputs 100, 102 and decide the location of the autonomous vehicle. The position databases 106, 108, 110 may be located locally inside the Electronic Control Module (ECM) in the vehicle. The databases 106, 108, 110 may store information relating to cellular/WiFi data, Bluetooth data, and street light data. The stored data may be used, for example, to assist with location estimation in a normal triangular approach. The map data 102 is used in a matching process to identify which road segment the vehicle is driving. The map matching process associates the vehicle's GPS position (latitude, longitude, altitude), and optionally the heading and speed information, to a road segment. The real time information is sent to a vehicle control center for autonomous vehicle management and monitoring vehicle location. The information includes the real time location information of the vehicle and road segment information.

Figure 2A:
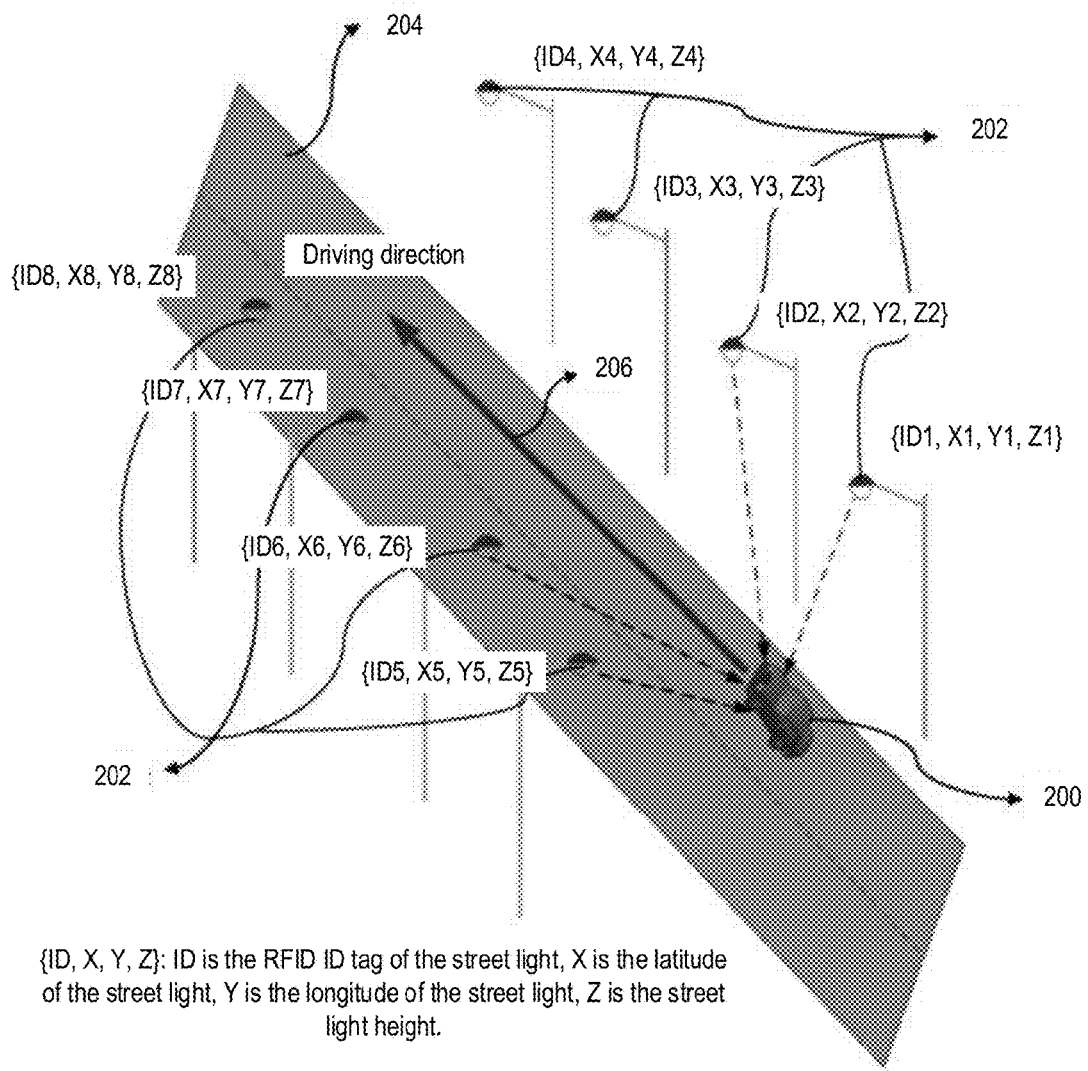
FIGS. 2A and 2B shows a vehicle and street light RFID tags according to embodiments of the invention.

Referring now to FIG. 2A, FIG. 2A illustrates a vehicle 200 and street lights having RFID tags 202 according to embodiments of the invention. The vehicle is traveling along a road segment 204. As the vehicle travels along the road segment in a certain driving direction 206, the vehicle passes the various street lights 202. In embodiments of the invention, the RFID tags on the street lights 202 are scanned. Each RFID tag is associated with certain information. The information is notated as {ID, X, Y, Z} in FIG. 2A, where ID is a unique identifier of a specific street light, X is the latitude of the street light. Y is the longitude of the street light, and Z is the height street light. It is noted that the latitude, longitude, and height could alternatively correspond to the latitude, longitude, and height of the RFID tag itself. When the RFID tag of a certain street light is scanned, the unique identifier, ID, is used to access a database (e.g. Street Light DB 106 from FIG. 1). The database may contain information about the street light, including the latitude, X; longitude, Y; and height, Z. A plurality of street lights, n, may be scanned, for example, in FIG. 2A, the street lights corresponding to identifiers ID1, ID2, ID5, and ID6 are scanned. The identifiers can then be used to retrieve the latitude, longitude, and height of each of the street lights from the Street Light database.

Figure 2B:
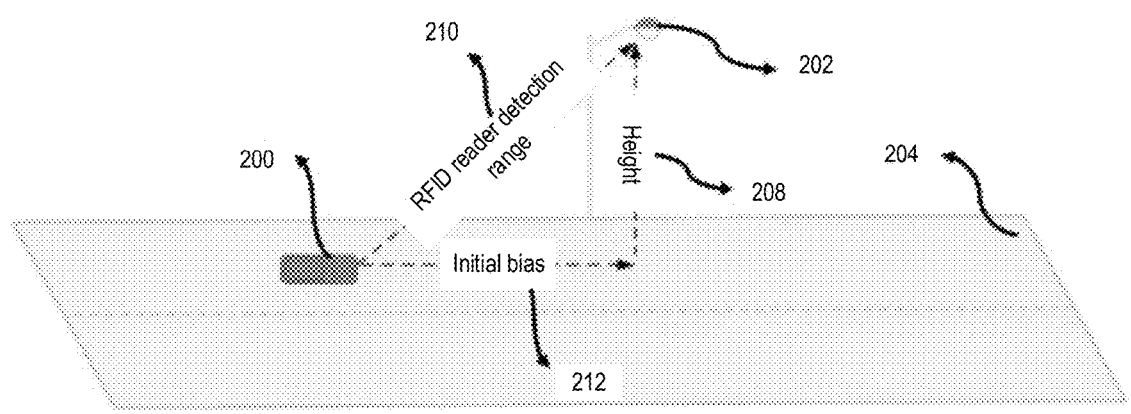

FIG. 2B illustrates the vehicle 200 scanning a single RFID tag on the street light 202 when the vehicle is on the road segment 204. The location of the vehicle 200 may be calculated using information associated with the scanned RFID tag, which may include the latitude, longitude, and height of the street light 202. The initial bias 212 of vehicle 200 may be calculated based on the vehicle driving speed, the vehicle heading information, and a timestamp of when the RFID tag was scanned. When the RFID tag is scanned by a RFID reader of the vehicle 200, the RFID reader detection range 210 may be used to estimate the location of the vehicle. When a single RFID tag is scanned, the initial bias 212, the RFID reader detection 210, and the height of the street light 208 of the single RFID tag may be used to calculate the location of the vehicle using the Pythagorean Theorem as follows:

$$\text{Initial bias}^2 = (\text{RFID reader detection range})^2 - (\text{Height})^2 \quad (1)$$

According to another exemplary embodiment, when multiple RFID tags are scanned at the same time, and it cannot be determined which RFID tag the vehicle is closest to, the information corresponding to multiple street light RFID tags is used to calculate the location of the vehicle 200. Calculating the location of the vehicle comprises averaging the longitude and averaging the latitude of the multiple scanned RFID tags at one point in time. For example, assume that in FIG. 2A the street lights with identifiers ID1, ID2, ID5, and ID6 have the following latitude and longitudes, respectively: 40.748448, −73.984761; 40.748567, −73.984693; 40.748691, −73.984988; and 40.748591, −73.985068. Thus, for this example set of street lights, an average latitude, longitude of 40.74857425, −73.9848775 is calculated. This averaged location represents the location of the vehicle at a point in time when the vehicle scanned the RFID tags. An additional bias calculation is made to account for the vehicle's motion. The bias is calculated based on the vehicle driving speed, vehicle heading information, and a time stamp corresponding to when the RFID tags were scanned. Thus, the location of the vehicle may be calculated using the following equation:

$$\text{Location}(x,y) = \text{bias}(\text{vehicle speed, heading, time}) + \Sigma_{k=1}^{n}(x_i, y_i)/n \quad (2)$$

Figure 3:
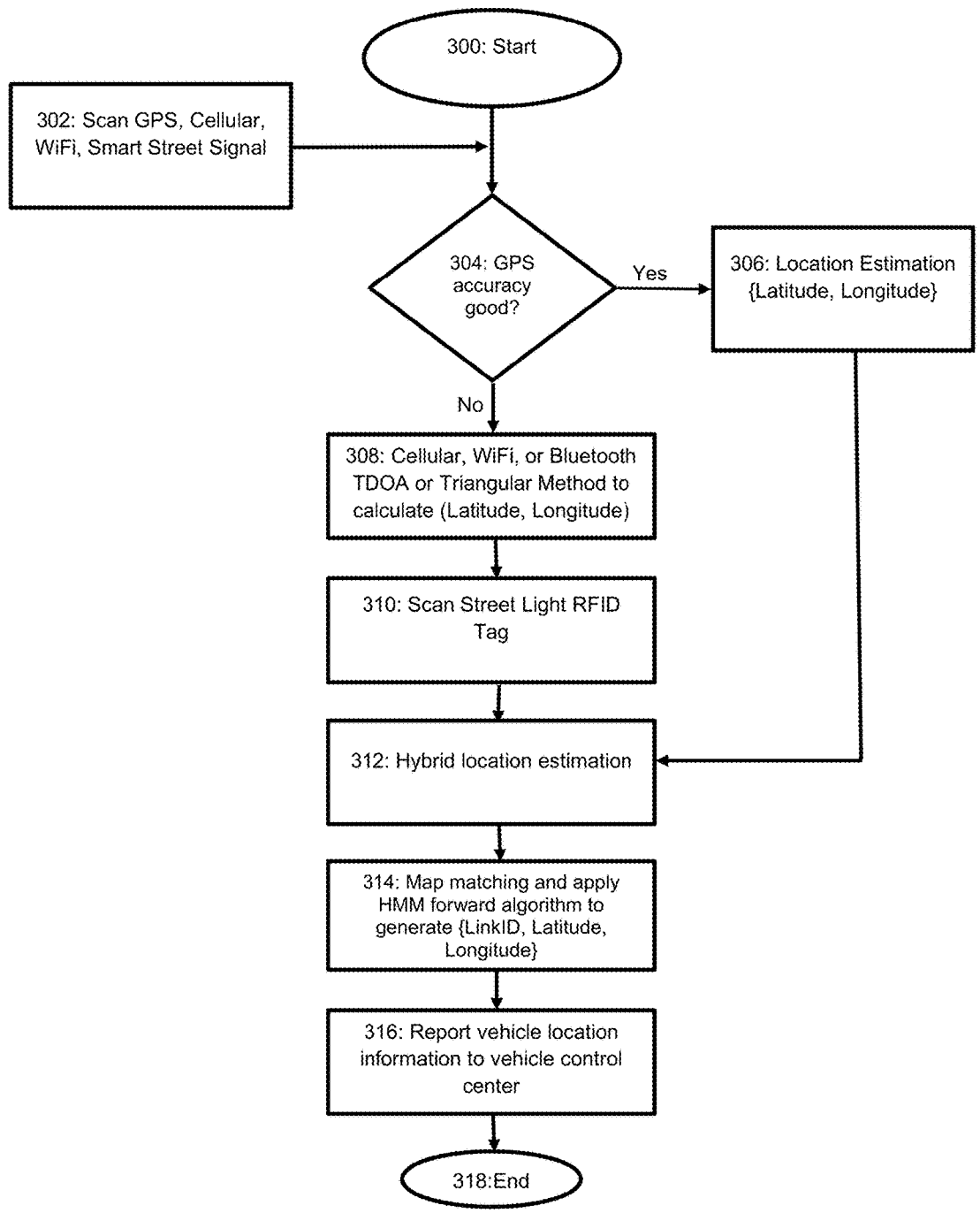
FIG. 3 is a logic flow diagram for autonomous vehicle location estimation and road link identification, and illustrates the operation of an exemplary method, a result of execution of computer program instructions embodied on a computer readable memory, functions performed by logic implemented in hardware, and/or interconnected means for performing functions in accordance with exemplary embodiments.

Referring now to FIG. 3, FIG. 3 shows a high level flowchart of autonomous vehicle location estimation and road link identification according to exemplary embodiments of the invention starting at step 300. At, step 302 scanning is performed for GPS, Cellular, WiFi, and Bluetooth signals. If available, the scanning is performed continuously. At step 304, the autonomous vehicle location estimation processing system checks the GPS signal quality. If the system determines that the (WS quality is not accurate enough (e.g. the signal quality is below some threshold), then the process continues to step 308. If the GPS signal quality is sufficient then the location estimation is performed at step 306 based on the GPS signal, and the process skips to the hybrid location estimation step 312. At step 308, various other location technologies may be utilized, such as cellular WiFi, and Bluetooth if any of these radio signals are available. At step 310, scanning is performed for street light RFID tags, and while the vehicle is driving, the street light position database is queried using the identifier of the RFID tag as the searching index. At step 312, a hybrid location estimation is performed to calculate the location of the autonomous vehicle. The hybrid location estimation can take account all of the information from steps 302, 308 and 310. For example, the scanned Cellular, and Bluetooth signals can be weighted with the GPS signals and RFID tag information depending on the quality of these signals. Once the location of the vehicle is determined, map matching processing is performed at step 314 by applying a Hidden Markov Model (HMM) forward algorithm to identify a road segment on which the vehicle is driving. The HMM forward algorithm is a well-known statistical filtering algorithm. The HMM forward algorithm is used to improve the location estimation accuracy on digital map given the road link connectivity and previous vehicle's known positions. At step 316, the estimate of the vehicle location and road segment ID are reported to the autonomous vehicle control center, and the process ends at step 318. The autonomous vehicle control center can use the reported information to provide a variety of services to manage autonomous vehicles, including tracking and monitoring a number of autonomous vehicles.

Figure 4:
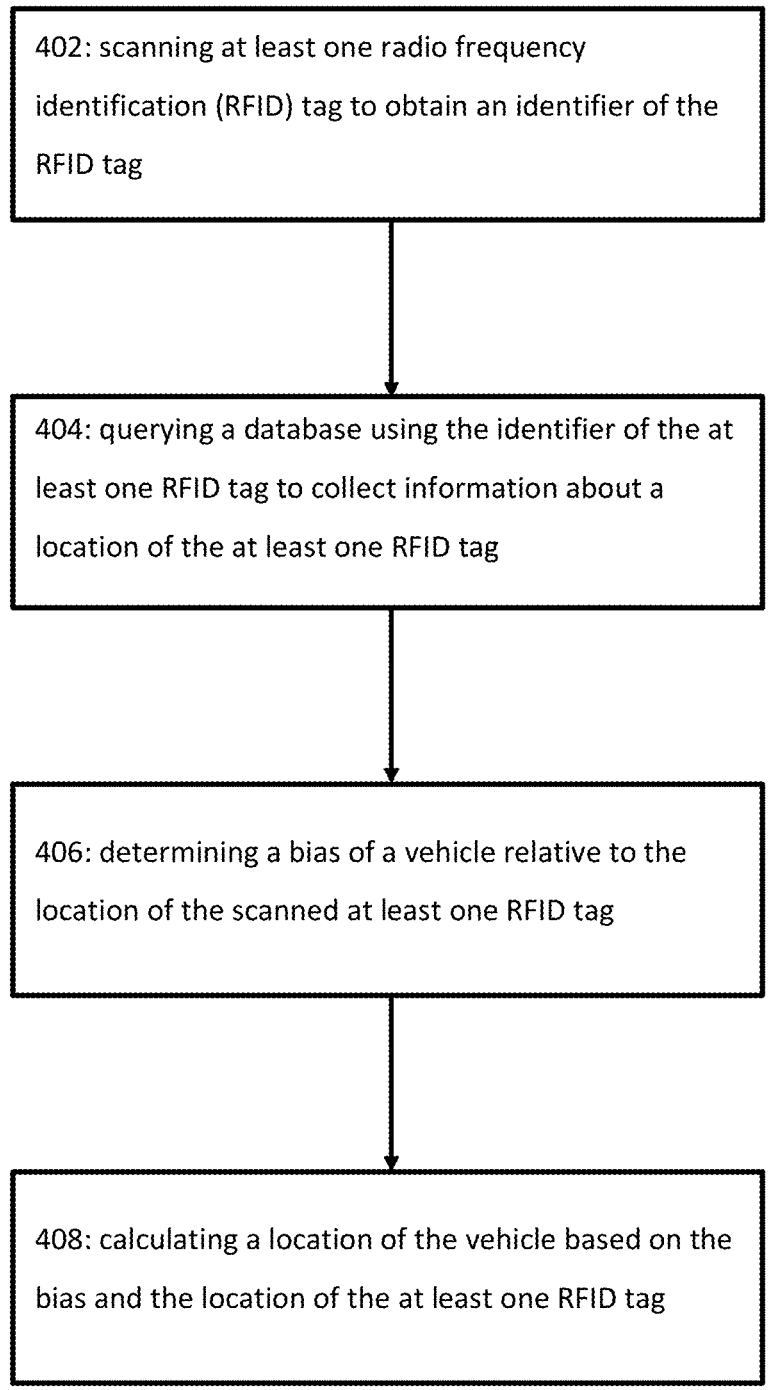
FIG. 4 is a process flow diagram showing operation of an apparatus according to certain exemplary embodiments of these teachings.

FIG. 4 shows a process flow diagram according to exemplary embodiments of these teachings. Referring to FIG. 4, at block 402 at least one RFID tag is scanned to obtain an identifier of the RFID tag. According to a certain embodiment of the invention, the scanning in block 402 may be dependent on the signal quality of a GPS signal. For example, if the GPS signal quality is above a certain threshold it may be possible to determine the location of the vehicle without scanning the RFID tags.

At block 404, a database is queried using the identifier of the scanned at least one RFID tag to collect information about a location of the at least one RFID tag. According to a certain embodiment of the invention, the information may include a latitude of the RFID tag, a longitude of the RFID tag and/or a height of the RFID tag.

At block 406, a bias of the vehicle is determined relative to the location of the scanned at least one RFID tag.

At block 408, the location of the vehicle is calculated based on the bias and the location of the at least one RFID tag. According to one version of the invention, the bias of the vehicle is based on at least one of vehicle speed, vehicle heading, and a time stamp. In another version, calculating the location of the vehicle includes averaging the latitude of the at least two RFID tags and longitude of the at least two RFID tags and adding the bias of the vehicle to the average longitude and the average longitude.

In one embodiment of the invention, prior to scanning the at least one RFID tag, a quality of a GPS signal is determined. If the GPS signal quality is greater than some predetermined threshold, then scanning the RFID tag(s) is not required. In this case, the GPS signal quality is sufficient to accurately determine the location of the vehicle. In another embodiment, when the GPS signal quality is equal to or less than the predetermined threshold then at least one other signal is scanned. The at least one other signals may be at least one of: a Bluetooth signal; a cellular signal; and a WiFi signal. These other signal may be used to help calculate the location of the vehicle.

The logic diagram of FIG. 4 may be considered to illustrate the operation of a method, and a result of execution of a computer program stored in a computer readable memory, and a specific manner in which components of an electronic device are configured to cause that electronic device to operate. The various blocks shown in FIG. 4 may also be considered as a plurality of coupled logic circuit elements constructed to carry out the associated function(s), or specific result of strings of computer program code or instructions stored in a memory.

Figure 5:
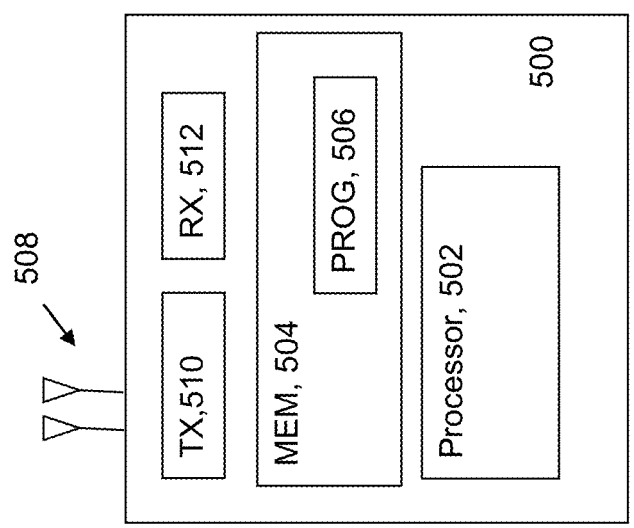
FIG. 5 is a high level schematic block diagram illustrating a computing device that is suitable for practicing the described and exemplary embodiments of these teachings.

As shown in the high level block diagram of FIG. 5 a computing system 500 is shown, which includes processing means such as at least one processor 502, for example a central processing unit (CPU), a storing means such as at least one computer-readable memory (MEM) 504 storing at least one computer program (PROG) 506. Also stored in the MEM 504 at reference number 506 are the computer code or computer implementable algorithm(s) for configuring the computer system to scan the radio frequency identification (RFID) tags; query the databases; determine a bias of a vehicle; and calculate a location of the vehicle based on the bias and the locations of the RFID tag(s). Although not shown, the computer system may also comprise various sensors, such as a compass, a gyroscope, or an accelerometer. Also stored in the MEM 504 may be the various databases shown in FIG. 1.

Also shown in the computer system 500, is a means for scanning which includes at least one antenna is shown at 508. The at least one antenna may be used to scan for GPS signals, Bluetooth signals, cellular signals, and/or WiFi signals according to embodiments of the invention. The antenna 508 may also be configured to scan for RFID tags according to aspects of the invention. The computer system 500 may also be configured to continuously send data to a vehicle control center about the calculated location of the vehicle using the at least one antenna. As such, the computing system 500 may further comprise at least one suitable radio frequency (RF) transceiver (transmitter 510 and receiver 512 pair) for bidirectional wireless communications with various devices via the at least one antenna 508. The wireless communications may include communications via Bluetooth, WiFi, GPS, or cellular communications. In some embodiments, the computing system 500 may also be configured to automate a vehicle's driving based on at least the location of the vehicle. In some embodiments the wireless communications may be used to send a vehicle control center the calculated location of the vehicle and the road segment the vehicle is traveling on. In response, the vehicle control center may send, and the computing system 500 may receive control and management commands to help plan the optimal route of the vehicle based on road traffic conditions.

The MEM 504 may comprise a random access memory (RAM) and a mass storage. Various embodiments of the computer readable MEMs 504 include any data storage technology type which is suitable to the local technical environment, including but not limited to: semiconductor based memory devices, magnetic memory devices and systems, optical memory devices and systems, fixed memory, removable memory, disc memory, flash memory, volatile memory (e.g. DRAM, SRAM), non-volatile memory (e.g. EEPROM, NVRAM), and the like.

The processor 502 and the MEM 504 are shown as separate components, however in some embodiments, the MEM 504 may be integrated with the at least one processor 502, such as the case may be for a system on a chip (SoC). In some embodiments, the MEM 504 may be shared dynamically by the processor 500. The processor 502 may be operating in either single precision floating point (32-bit) or double precision floating point (64-bit) format. Although not shown, some embodiments may include a BUS which may include a northbridge for connecting the processor 502 and the MEM 504. The bus may further include a southbridge for connecting any display units that may be connected to the computing system 500 and/or input devices. In other embodiments, the northbridge may be integrated with the processor 502.

In general, the various embodiments of the computer system in FIG. 5 can include the ECM with multiple Digital Input/Digital Output (DI/DO) and Analog Input/Analog Output (AI/AO). Alternatively, the location process may be handled on the network side. However, the response time must be guaranteed, and therefore local processing might provide better accuracy.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

The embodiments described herein provide a solution to the problem of calculating the location of a vehicle using various different inputs, such as GPS, WiFi, Cellular, Bluetooth, and RFID tags, which is particularly helpful in situations where GPS signals may be partially or fully blocked.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
    scanning, by a computing system onboard a vehicle as the vehicle travels along a road, at least one radio frequency identification (RFID) tag to obtain an identifier of the RFID tag;
    querying, by the computing system, a database using the identifier of the at least one RFID tag to collect information about a location of the at least one RFID tag;
    determining, by the computing system, a bias of a vehicle relative to the location of the scanned at least one RFID tag and corresponding to (a) the vehicle's motion and (b) a timestamp corresponding to when the at least one RFID tag was scanned;
    calculating, by the computing system, a location of the vehicle based on the bias and the location of the at least one RFID tag, wherein calculating the location of the vehicle comprises:
        when the at least one RFID tag consists of one RFID tag, determining an initial bias of the vehicle with respect to the location of the at least one RFID tag based at least in part on a height of the RFID tag and adding the bias of the vehicle determined based on the vehicle's motion to the initial bias of the vehicle, and
        when the at least one RFID tag comprises two or more RFID tags, determining an RFID location based on the information about the location of each of the two or more RFID tags and adding the bias of the vehicle to the RFID location; and
    at least one of:
        providing, by the computing system onboard the vehicle, the location of the vehicle to a remote computing system not onboard the vehicle for use in performing, by the remote computing system, one or more routing functions for the vehicle, or
        using, by the computing system onboard the vehicle, the location of the vehicle to perform one or more routing functions for the vehicle.

2. The method of claim 1, the bias of the vehicle is based on at least one of speed, vehicle heading, and time.

3. The method of claim 1, wherein the information about the location of the at least one RFID tag comprises a latitude of the RFID tag, a longitude of the RFID tag and the height of the RFID tag.

4. The method of claim 3, wherein:
when the at least one RFID tag consists of the one RFID tag, the initial bias of the vehicle is determined with respect to the latitude of the RFID tag and the longitude of the RFID tag based at least in part on the height of the RFID tag, and
when the at least one RFID tag comprises the two or more RFID tags, calculating the RFID location comprises averaging the latitude of the at least one RFID tag and averaging the longitude of the at least one RFID tag and adding the bias of the vehicle to the RFID location comprises adding a latitude component of the bias of the vehicle to the average latitude and adding a longitude component of the bias of the vehicle to the average longitude.

5. The method of claim 1, further comprising:
prior to the scanning the at least one RFID tag, determining quality of a GPS signal; and
determining the location of the vehicle based on the GPS signal when the quality of the GPS signal is above a predetermined threshold.

6. The method of claim 5, further comprising:
scanning at least one other signal to determine location information of the vehicle if the quality of the GPS signal is below the predetermined threshold.

7. The method of claim 6, wherein the at least one other signal is one of: a Bluetooth signal; a cellular signal; and a WiFi signal.

8. The method of claim 6, wherein calculating the location of the vehicle is further based on the GPS signal and the at least one other signal.

9. The method of claim 1, wherein the at least one RFID tag is located on at least one street light.

10. The method of claim 1, wherein the vehicle is an autonomous vehicle and the database is stored in a memory onboard the vehicle that is associated with an electronic control module of the vehicle.

11. An apparatus onboard a vehicle and comprising:
at least one processor; and
at least one memory including computer program code;
the at least one memory and the computer program code configured to, with the at least one processor, cause the apparatus, as the vehicle travels along a road, at least to perform:
scan at least one radio frequency identification (RFID) tag to obtain an identifier of the RFID tag;
query a database using the identifier of the at least one RFID tag to collect information about a location of the at least one RFID tag;
determine a bias of the vehicle relative to the location of the scanned at least one RFID tag and corresponding to (a) the vehicle's motion and (b) a timestamp corresponding to when the at least one RFID tag was scanned;
calculate a location of the vehicle based on the bias and the location of each of the two or more RFID tag, wherein calculating the location of the vehicle comprises:
when the at least one RFID tag consists of one RFID tag, determining an initial bias of the vehicle with respect to the location of the at least one RFID tag based at least in part on a height of the RFID tag and adding the bias of the vehicle determined based on the vehicle's motion to the initial bias of the vehicle, and
when the at least one RFID tag comprises two or more RFID tags, determining an RFID location based on the information about the location of the at least one RFID tags and adding the bias of the vehicle to the RFID location; and
at least one of:
provide the location of the vehicle to a remote computing system not onboard the vehicle for use in performing, by the remote computing system, one or more routing functions for the vehicle, or
use the location of the vehicle to perform one or more routing functions for the vehicle.

12. The apparatus according to claim 11, wherein the bias of the vehicle is based on at least one of speed, vehicle heading, and a time stamp.

13. The apparatus according to claim 11, wherein the information about the location of the at least one RFID tag comprises a latitude of the RFID tag and a longitude of the RFID tag.

14. The apparatus according to claim 13, wherein:
when the at least one RFID tag consists of the one RFID tag, the initial bias of the vehicle is determined with respect to the latitude of the RFID tag and the longitude of the RFID tag based at least in part on the height of the RFID tag, and
when the at least one RFID tag comprises the two or more RFID tags, calculating the RFID location comprises averaging the latitude of the at least one RFID tag and averaging the longitude of the at least one RFID tag and adding the bias of the vehicle to the RFID location comprises adding a latitude component of the bias of the vehicle to the average latitude and adding a longitude component of the bias of the vehicle to the average longitude.

15. The apparatus of claim 11, wherein the at least one processor, and the at least one memory including computer program code are further configured to:
prior to the scanning the at least one RFID tag, determine quality of a GPS signal; and
determine the location of the vehicle based on the GPS signal when the quality of the GPS signal is above a predetermined threshold.

16. The apparatus of claim 15, wherein the at least one processor, and the at least one memory including computer program code are further configured to:
scan at least one other signal to determine location information of the vehicle if the quality of the GPS signal is below the predetermined threshold.

17. The apparatus of any of claim 16, wherein the at least one other signal is one of: a Bluetooth signal; a cellular signal; and a WiFi signal.

18. The apparatus of claim 16, wherein calculating the location of the vehicle is further based on the GPS signal and the at least one other signal.

19. The apparatus of claim 11, wherein the at least one RFID tag is located on at least one street light.

20. The apparatus of claim 11, wherein the vehicle is an autonomous vehicle.

* * * * *